US011318417B2

(12) United States Patent
Baxter

(10) Patent No.: US 11,318,417 B2
(45) Date of Patent: May 3, 2022

(54) COMPONENT REMOVAL FROM A GAS

(71) Applicant: Sustainable Energy Solutions, Inc., Provo, UT (US)

(72) Inventor: Larry Baxter, Orem, UT (US)

(73) Assignee: Sustainable Energy Solutions, Inc., Ball Ground, GA (US)

( * ) Notice: Subject to any disclaimer, the term of this patent is extended or adjusted under 35 U.S.C. 154(b) by 399 days.

(21) Appl. No.: 16/356,135

(22) Filed: Mar. 18, 2019

(65) Prior Publication Data

US 2020/0298179 A1 Sep. 24, 2020

(51) Int. Cl.

| | |
|---|---|
| ***B01D 53/76*** | (2006.01) |
| ***B01J 20/26*** | (2006.01) |
| ***B01J 20/28*** | (2006.01) |
| ***B01J 20/32*** | (2006.01) |
| ***C08L 27/18*** | (2006.01) |
| ***C08L 71/02*** | (2006.01) |
| ***C08L 83/04*** | (2006.01) |

(52) U.S. Cl.

CPC ............ *B01D 53/76* (2013.01); *B01J 20/265* (2013.01); *B01J 20/28016* (2013.01); *B01J 20/327* (2013.01); *B01J 20/3293* (2013.01); *C08L 27/18* (2013.01); *C08L 71/02* (2013.01); *C08L 83/04* (2013.01); *B01D 2257/302* (2013.01); *B01D 2257/304* (2013.01); *B01D 2257/404* (2013.01); *B01D 2257/408* (2013.01); *B01D 2257/504* (2013.01); *B01D 2257/602* (2013.01); *B01D 2257/702* (2013.01); *B01D 2258/0283* (2013.01); *B01D 2259/657* (2013.01); *C08L 2207/53* (2013.01)

(58) Field of Classification Search

CPC ........ B01D 2257/302; B01D 2257/304; B01D 2257/404; B01D 2257/408; B01D 2257/504; B01D 2257/602; B01D 2257/702; B01D 2258/0283; B01D 2259/657; B01D 53/76; B01D 53/83; B01J 20/265; B01J 20/28016; B01J 20/327; B01J 20/3293; C08G 65/007; C08L 2207/53; C08L 27/18; C08L 71/02; C08L 83/04; Y02C 20/40; Y02P 20/151

See application file for complete search history.

(56) References Cited

U.S. PATENT DOCUMENTS

2019/0240613 A1 * 8/2019 Raynel .................... C10L 3/102

* cited by examiner

*Primary Examiner* — Cabrena Holecek
(74) *Attorney, Agent, or Firm* — Cook Alex Ltd.

(57) ABSTRACT

A device, system, and method for removing a component from a gas are disclosed. A bead consisting of a core and an outer layer is provided. The outer layer consists of a first impermeable material. The core consists of a second material. A carrier gas, containing a vapor, is passed across the bead, desublimating or desublimating and condensing a portion of the vapor onto the bead. In some embodiments, the beads are passed into the column at a first temperature and the carrier gas is passed across the beads. A portion of the vapor desublimates or desublimates and condenses onto the beads as a solid product, causing the beads to expand in volume as they are warmed to a second temperature. The beads with the solid product are passed out of the column.

20 Claims, 5 Drawing Sheets

500

501
Provide a bead with a core and an outer layer, the outer layer being a first material and the core a second material.

502
Pass a carrier gas (the carrier gas containing a vapor) across the bead

COMPONENT REMOVAL FROM A GAS

GOVERNMENT INTEREST STATEMENT

This invention was made with government support under DE-FE0028697 awarded by the Department of Energy. The government has certain rights in the invention.

TECHNICAL FIELD

The methods and processes described herein relate generally to gas separations. More particularly, the methods and processes described herein relate to capturing gases with solids.

BACKGROUND

The removal of carbon dioxide, other acid gases, and contaminants from flue gas, syngas, and other gas streams can be accomplished by a variety of methods such as by condensation followed by distillation or desublimation into a contact fluid followed by solid-liquid separation. These methods can have limitations, including high energy requirements, inefficiencies, and expense. Vapor removal from a gas stream is important and improved devices, methods, and systems could be beneficial.

SUMMARY

In a first aspect, the disclosure provides a device for removing a vapor from a carrier gas. The device is a plurality of beads consisting of a core and an outer layer. The outer layer consists of a first impermeable material. The core consists of a second material. A carrier gas, containing a vapor, is passed across the bead. The bead is at a temperature that causes a portion of the vapor to desublimate or desublimate and condense a portion of the vapor onto the bead.

In a second aspect, the disclosure provides a method for removing a vapor from a carrier gas. A plurality of beads are provided consisting of a core and an outer layer. The outer layer consists of a first impermeable material and the core consists of a second material. A carrier gas, containing a vapor, is passed across the bead. The beads are at a temperature that causes a portion of the vapor to desublimate or desublimate and condense onto the bead.

In a third aspect, the disclosure provides a system for removing a component from a gas. The system includes a column, a plurality of beads, and a carrier gas. The plurality of beads consist of a core and an outer layer. The outer layer consists of a first impermeable material and the core consists of a second material. The beads are passed into the column at a first temperature and a carrier gas, containing a vapor, is passed across the beads. A portion of the vapor desublimates or desublimates and condenses onto the beads as a solid product, causing the beads to change in volume as they are warmed to a second temperature. The beads with the solid product are passed out of the column.

Further aspects and embodiments are provided in the foregoing drawings, detailed description and claims.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

Figure 1:
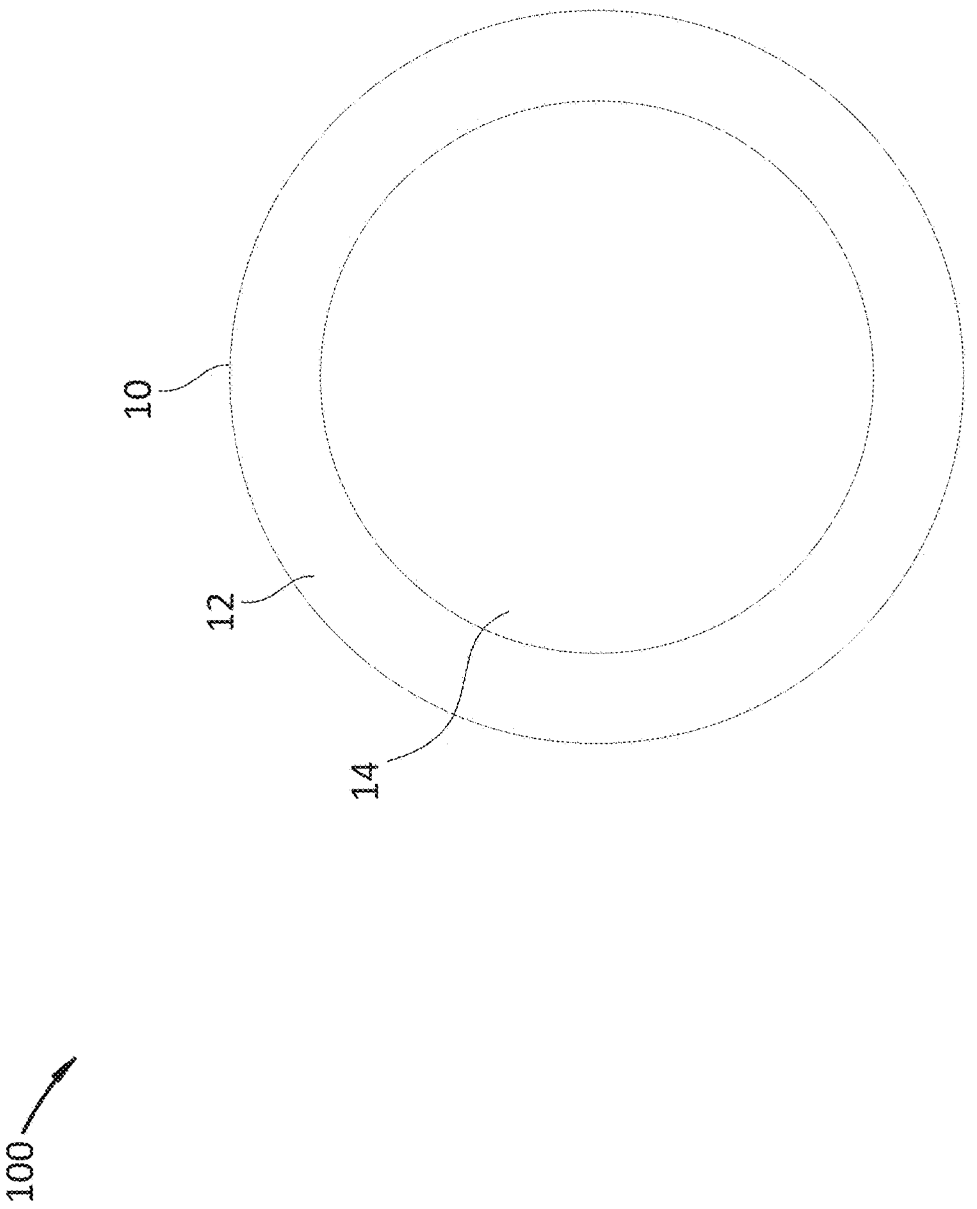
FIG. 1 is a cross-sectional view of a bead as per one embodiment of the present invention.

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms “a,” “an,” and “the” include plural referents unless the context clearly dictates otherwise. For example, reference to “a substituent” encompasses a single substituent as well as two or more substituents, and the like.

As used herein, “for example,” “for instance,” “such as,” or “including” are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, “condensing” is meant to refer to the process of a vapor being cooled to a liquid. As used herein, “desublimating” is meant to refer to the process of a vapor being cooled to a solid. As used herein, “cryogenic” is intended to refer to temperatures below about −58° F. (−50° C.).

Combustion flue gas consists of the exhaust gas from a fireplace, oven, furnace, boiler, steam generator, or other combustor. The combustion fuel sources include coal, hydrocarbons, and bio-mass. Combustion flue gas varies greatly in composition depending on the method of combustion and the source of fuel. Combustion in pure oxygen produces little to no nitrogen in the flue gas. Combustion using air leads to the majority of the flue gas consisting of nitrogen. The non-nitrogen flue gas consists of mostly carbon dioxide, water, and sometimes unconsumed oxygen. Small amounts of carbon monoxide, nitrogen oxides, sulfur dioxide, hydrogen sulfide, and trace amounts of hundreds of other chemicals are present, depending on the source. Entrained dust and soot will also be present in all combustion flue gas streams. The method disclosed applies to any combustion flue gases. Dried combustion flue gas has had the water removed.

Syngas consists of hydrogen, carbon monoxide, and carbon dioxide.

Producer gas consists of a fuel gas manufactured from materials such as coal, wood, or syngas. It consists mostly of carbon monoxide, with tars and carbon dioxide present as well.

Steam reforming is the process of producing hydrogen, carbon monoxide, and other compounds from hydrocarbon fuels, including natural gas. The steam reforming gas referred to herein consists primarily of carbon monoxide and hydrogen, with varying amounts of carbon dioxide and water.

Light gases include gases with higher volatility than water, including hydrogen, helium, carbon dioxide, nitrogen, and oxygen. This list is for example only and should not be implied to constitute a limitation as to the viability of other gases in the process. A person of skill in the art would be able to evaluate any gas as to whether it has higher volatility than water.

Refinery off-gases comprise gases produced by refining precious metals, such as gold and silver. These off-gases tend to contain significant amounts of mercury and other metals.

Vapor removal from a gas stream is accomplished by many methods, most of which are expensive, energy intensive, or inefficient. This application discloses methods, systems, and devices for removing a vapor from a gas in an energy efficient, simple, and effective manner.

A bead with an outer layer of a first impermeable material and a core layer of a second material is provided at a first temperature. The first impermeable material is preferably a material that can expand and contract as much as the core expands and contracts and does not allow diffusion of gases. The ability to expand and contract in this manner allows the first impermeable material to contain the core. The second material is preferably a high heat capacity solid material, a solid that melts at a lower temperature than the first impermeable material, or a gas. The first impermeable material also acts to insulate the second material from striking solid surfaces and flaking material off the second material, when the second material is a high heat capacity solid. The first impermeable material, in that embodiment, would also be resistant to wear from striking solid surfaces. When the second material, the core, is a solid that melts or a gas, the first impermeable material also acts as containment. The benefit of having a solid that melts as the core material is that each bead will have not only sensible heat absorption capacity, but latent heat absorption capacity.

When a carrier gas containing a vapor passes across the beads, a portion of the vapor desublimates or desublimates and condenses onto the beads. In some embodiments, any vapor that condenses onto the surface will then freeze. The heat of desublimation or the heat of desublimation and the heat of condensation is transferred into the beads, resulting in the beads changing in volume. In some embodiments, the beads will expand. In other embodiments, the beads will contract. The solids already frozen to the surface crack as the bead changes volume. A portion of the solids may flake off the beads. As the beads collide, more of the solids may be knocked off the beads. The gas stream leaves the solids and beads behind, thus separating the vapor from the gas stream. The beads with the solids on the surface can be reused by cooling the beads to the first temperature. This causes the bead to revert to the previous volume, resulting in solids on the surface cracking and flaking off the bead. Cracking and flaking from expansion or contraction of the bead is beneficial because the flaked off solids do not then need to be separated from the beads later. The bead can then be reused for vapor removal from the gas. Simple solid/solid separation techniques, such as screening, can be used to separate the flakes of solid from the beads.

Now referring to FIG. 1, FIG. 1 is a cross-sectional view 100 of a bead as per one embodiment of the present invention. Bead 10 consists of a core 14 and an outer layer 12. The outer layer 12 is made of a first impermeable material. The core 14 is made of a second material. A carrier gas, containing a vapor, passed across the bead 10 desublimates or desublimates and condenses a portion of the vapor onto the bead.

Figure 2:
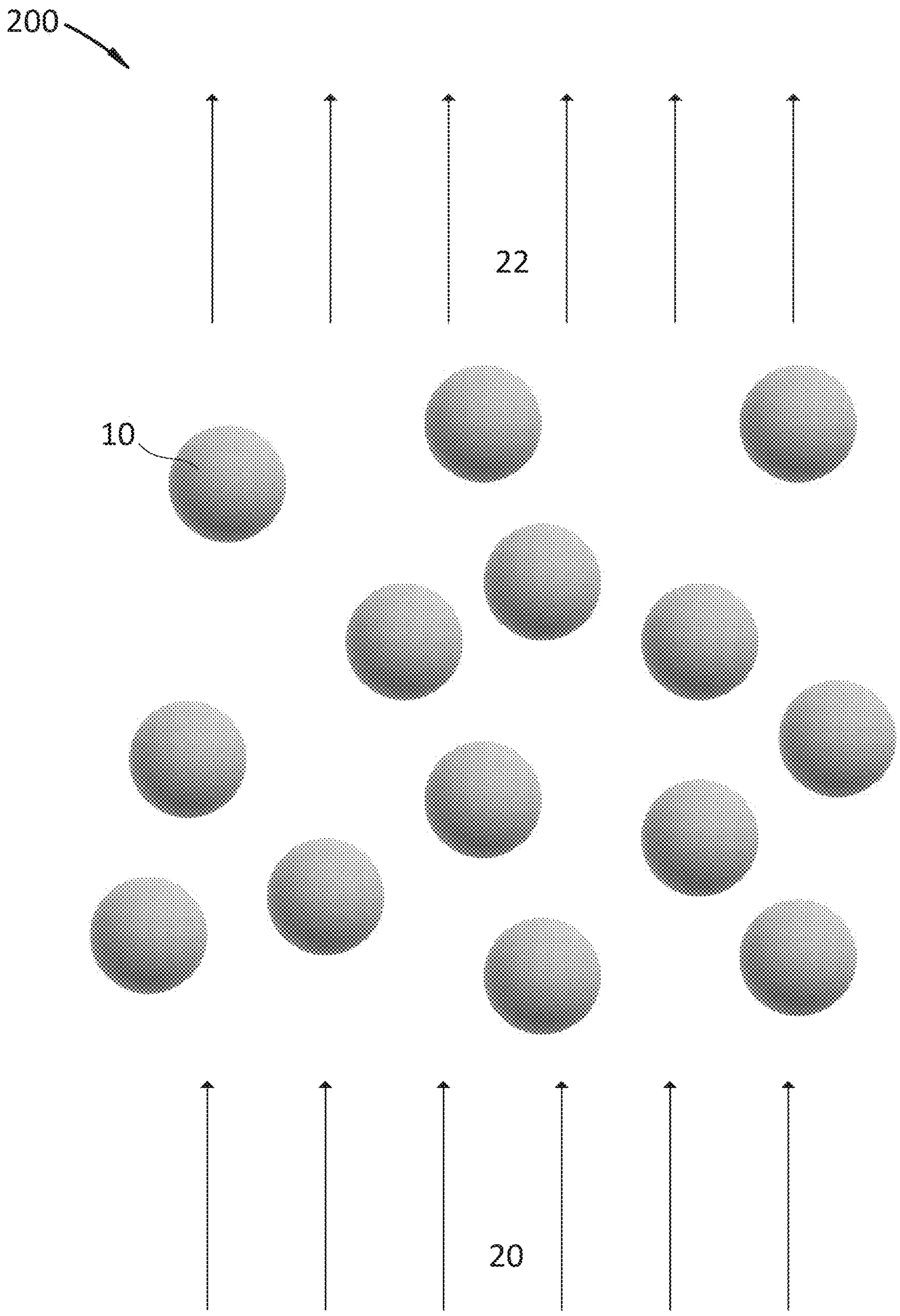
FIG. 2 is a side view of a number of beads of FIG. 1 falling against a carrier gas as per one embodiment of the present invention.

Now referring to FIG. 2, FIG. 2 is a side view 200 of a plurality of beads 10 of FIG. 1 falling against a carrier gas 20, as per one embodiment of the present invention. The carrier gas 20 in this embodiment is flue gas. The vapor in the flue gas is carbon dioxide and water. The beads are at a temperature below −56.6° C. As the carrier gas 20 passes upwards against the beads 10, a portion of the carbon dioxide and water desublimates onto the beads. The depleted carrier gas 22 leaves as a dry, depleted flue gas.

Figure 3A:
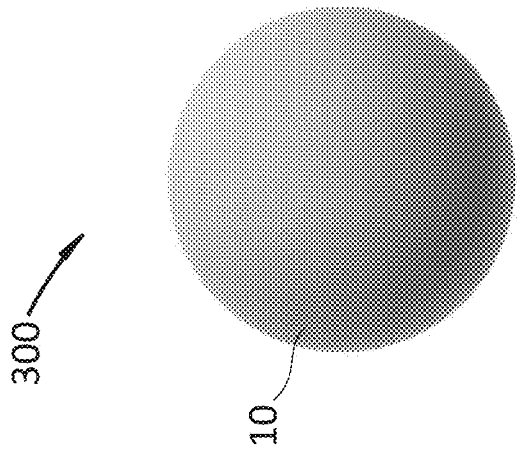
FIG. 3A is a side view of the bead of FIG. 1 at a first temperature.
Figure 3B:
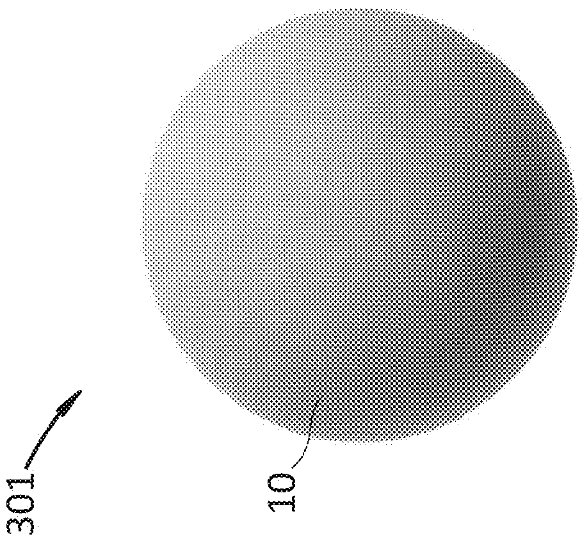
FIG. 3B is a side view of the bead of FIG. 1 at a second temperature.

Now referring to FIGS. 3A and 3B, FIG. 3A is a side view of the bead 10 of FIG. 1 at a first temperature and FIG. 3B is a side view of the bead 10 of FIG. 1 at a second temperature. The bead 10 of FIG. 3B is at a lower temperature than the bead 10 of FIG. 3B. The expansion and contraction of the bead 10 is a preferred feature of the present invention. The expansion of the bead 10 due to absorption of heat from the desublimating or desublimating and condensing of the vapor results in the solids already on the surface of the bead 10 cracking. This expansion induced cracking results in some of the solids flaking off the surface of the beads. In some embodiments, the bead 10 with the solids on the surface is cooled, resulting in contraction of the bead 10, also causing cracking of the solids and solids flaking off the surface of the bead 10.

Figure 4:
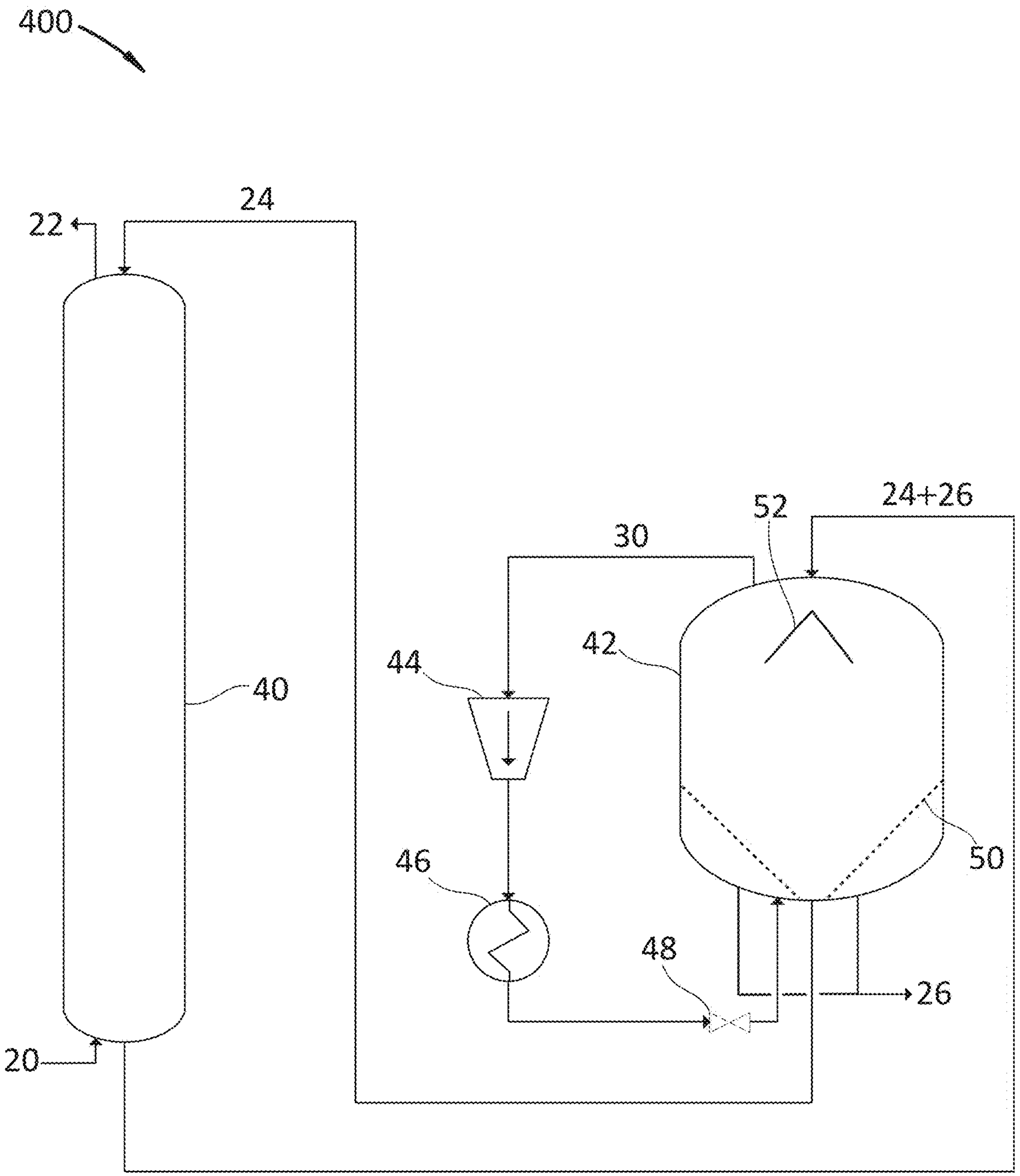
FIG. 4 is a process flow diagram showing a system for removing a component from a gas as per one embodiment of the present invention.

Now referring to FIG. 4, FIG. 4 is a process flow diagram 400 showing a system for removing a component from a gas as per one embodiment of the present invention. A carrier gas 20, containing a vapor, is passed into a column 40. In this embodiment, column 40 is a hail tower. Beads 24, at a first temperature, are dropped into the column 40 against the carrier gas 20. In this embodiment, the beads 24 are at a first temperature −140° C., have a core made of a solid near its melting point or a condensed liquid near its vapor pressure or gas, and an outer layer made of polytetraflouroethylene (PTFE). In this embodiment, the carrier gas 20 is syngas, containing hydrogen, carbon monoxide, and carbon dioxide, and the carbon dioxide is the vapor. Carbon dioxide desublimates from the carrier gas 20 onto the beads 24 as a solid product 26. As the carbon dioxide desublimates onto the beads 24, the beads 24 expand in volume from the heat of desublimation transferring from the carbon dioxide into the beads 24. This expansion results in a portion of the solid product 26 cracking and flaking off of the beads.

The beads 24, at a second temperature −100° C., and the solid product 26 exit the column 40 and are passed into a first heat exchanger 42. The solid products are deflected to the sides by a diverter 52 and pass across a screen 50. The solid product 26 and the beads 24 are cooled in the first heat exchanger 42 to the first temperature, resulting in the beads 24 contracting in volume and the solids product that accumulates on the beads 26 cracking and flaking off of the beads 24. The solid products 26 pass through screen 50 and are collected. The beads 24 are passed back to the column 40.

Figure 5:
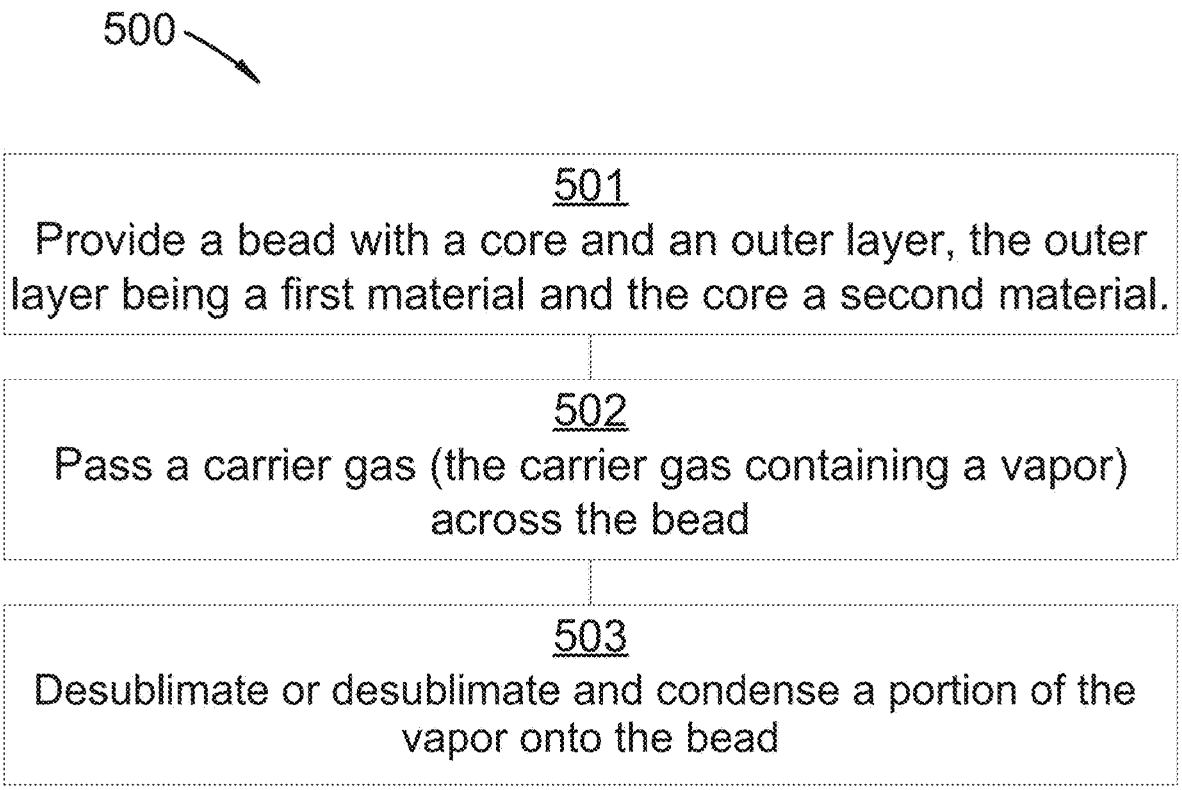
FIG. 5 is a block diagram describing a method for removing a component from a gas as per one embodiment of the present invention.

Now referring to FIG. 5, FIG. 5 is a block diagram 500 describing a method for removing a component from a gas as per one embodiment of the present invention. At 501, a bead with a core and an outer layer is provided. The outer layer consists of a first impermeable material and the core a second material. At 502, a carrier gas, containing a vapor, is passed across the bead. At 503, a portion of the vapor is desublimated or desublimated and condensed onto the bead.

In some embodiments, the first impermeable material is selected from the group consisting of polytetraflouroethylene (PTFE), polychlorotrifluoroethylene, fluorinated ethylene propylene, perfluoroalkoxy polymer resin, polyether ether ketone, other polyaryl ether ketones, polyimides, polyoxydiphenylenepyromellitimide, platinum-cured silicone, peroxide-cured silicone, thermoplastics, other rubbers, other polymers, or combinations thereof. In some embodiments, the first impermeable material is made of any material that does not bind to solids, including the group above. In some embodiments, the first impermeable material is made of any material that remains flexible at cryogenic temperatures. In some embodiments, the first impermeable material is made of any material with high thermal conductivity, including metals. In some embodiments, the first impermeable material is made of any material that changes density with changing temperature enough to spall the solid product off the surface.

In some embodiments, the second material melts at a lower temperature than the first impermeable material. The benefit of having a core that melts is that the latent heat of phase change is greater than the sensible heat that could be absorbed, resulting in a greater amount of heat removal from the carrier gas. Further, the phase change results in an expansion or contraction of the bead, resulting in cracking and flaking of the solid product off the surface.

In other embodiments, the second material is a gas, such as nitrogen and argon. The expansion and contraction of the gas over the temperature range causes the first impermeable material to expand and contract extensively, causing cracking and flaking off of the solid product.

In some embodiments, the second material is a solid with a heat capacity greater than 1 J/g·K. This heat capacity can include both sensible heat capacity and the latent heat of phase change as the second material melts to a liquid.

In some embodiments, the first and second material are the same compound, but with different structures. In one embodiment, the second material is high-density PTFE and the first impermeable material is low-density PTFE. In another embodiment, the second material is a porous metal and the first impermeable material is a solid metal. In both these embodiments, the core is less dense than the outer layer. In some embodiments, the core is made less dense by heat treating the core differently than the outer layer to produce different strengths and expandability.

In some embodiments, the carrier gas is selected from the group consisting of flue gas, syngas, producer gas, natural gas, steam reforming gas, hydrocarbons, light gases, refinery off-gases, organic solvents, water, ammonia, liquid ammonia, or combinations thereof.

In some embodiments, the vapor is selected from the group consisting of carbon dioxide, nitrogen oxide, sulfur dioxide, nitrogen dioxide, sulfur trioxide, hydrogen sulfide, hydrogen cyanide, water, mercury, hydrocarbons, pharmaceuticals, salts, biomass, or combinations thereof.

In a preferred embodiment, at least 80% of the vapor is removed from the carrier gas. In a more preferred embodiment, at least 90% of the vapor is removed from the carrier gas. In an even more preferred embodiment, at least 99% of the vapor is removed from the carrier gas. In a most preferred embodiment, at least 99.9% of the vapor is removed from the carrier gas.

The invention has been described with reference to various specific and preferred embodiments and techniques. Nevertheless, it is understood that many variations and modifications may be made while remaining within the spirit and scope of the invention.

What is claimed is:

1. A device for removing a portion of a vapor from a carrier gas comprising:

a plurality of beads, each comprising a core and an outer layer;

the outer layer comprising a first impermeable material;

the core comprising a second material;

wherein, the carrier gas, comprising the vapor, passes across the bead, the bead being at a temperature that causes the portion of the vapor to desublimate or desublimate and condense onto the bead; and wherein the second material comprises the same compound as the first impermeable material with a different lattice structure such that the second material and the first impermeable material have different densities.

2. The invention of claim 1, wherein the first impermeable material comprises a solid material sufficiently elastic to expand and contract to prevent a break in the outer layer as the core expands and contracts in response to temperature differences.

3. The invention of claim 1, wherein the first impermeable material is selected from the group consisting of polytetraflouroethylene, polychlorotrifluoroethylene, fluorinated ethylene propylene, perfluoroalkoxy polymer resin, polyether ether ketone, other polyaryl ether ketones, polyimides, polyoxydiphenylenepyromellitimide, platinum-cured silicone, peroxide-cured silicone, thermoplastics, other rubbers, other polymers, or combinations thereof.

4. The invention of claim 1, wherein the second material comprises a solid with a heat capacity greater than 1 J/g·K.

5. The invention of claim 1, wherein the second material comprises a solid that melts at a lower temperature than the first impermeable material.

6. The invention of claim 1, wherein the second material comprises a gas.

7. A device for removing a portion of a vapor from a carrier gas comprising:

a plurality of beads, each comprising a core and an outer layer;

the outer layer comprising a first impermeable material;

the core comprising a second material;

wherein, the carrier gas, comprising the vapor, passes across the bead, the bead being at a temperature that causes the portion of the vapor to desublimate or desublimate and condense onto the bead, and wherein the second material comprises a porous version of the first material which differs in its thermal expansion coefficient (for polymers and metals) or the same material that has undergone different heat treatment or working to produce different strengths or thermal expansion coefficients (metals) or a different formulation of the same or similar alloy/blend such that it produces different thermal expansion coefficients (metals or plastics).

8. A method for removing a vapor from a carrier gas comprising:

providing a plurality of beads comprising a core and an outer layer, wherein the outer layer comprises a first impermeable material and the core comprises a second material, and wherein the plurality of beads are at a temperature that causes the vapor to desublimate or desublimate and condense onto the plurality of beads;

passing the carrier gas, comprising the vapor, across the plurality of beads; and desublimating or desublimating and condensing a portion of the vapor onto the bead.

9. The invention of claim 8, wherein the first impermeable material comprises a solid material sufficiently flexible to expand and contract at least as much as the core expands and contracts.

10. The invention of claim 8, wherein the first impermeable material is selected from the group consisting of polytetraflouroethylene, polychlorotrifluoroethylene, fluorinated ethylene propylene, perfluoroalkoxy polymer resin, polyether ether ketone, other polyaryl ether ketones, polyimides, poly-oxydiphenylenepyromellitimide, platinum-cured silicone, peroxide-cured silicone, thermoplastics, other rubbers, other polymers, or combinations thereof.

11. The invention of claim 8, wherein the second material comprises a solid with a heat capacity greater than 1 J/g·K.

12. The invention of claim 8, wherein the second material comprises a solid that melts at a lower temperature than the first impermeable material.

13. The invention of claim 8, wherein the second material comprises a gas.

14. The invention of claim 8, wherein the carrier gas is selected from the group consisting of flue gas, syngas, producer gas, natural gas, steam reforming gas, hydrocarbons, light gases, refinery off-gases, organic solvents, water, ammonia, liquid ammonia, or combinations thereof.

15. The invention of claim 8, wherein the vapor is selected from the group consisting of carbon dioxide, nitrogen oxide, sulfur dioxide, nitrogen dioxide, sulfur trioxide, hydrogen sulfide, hydrogen cyanide, water, mercury, hydrocarbons, pharmaceuticals, salts, biomass, or combinations thereof.

16. The invention of claim 8, wherein desublimating, or desublimating and condensing the portion of the vapor onto the bead causes the bead to contract in volume, resulting in solid material on an outer surface of the bead cracking and flaking off the bead.

17. The invention of claim 8, further comprising cooling the bead and the portion of the vapor resulting in solid material on an outer surface of the bead cracking and flaking off the bead.

18. A system for removing a portion of a vapor from a carrier gas comprising:

a column configured to receive the carrier gas and a plurality of beads and pass the carrier gas across the beads;

wherein the plurality of beads comprise a core and an outer layer and wherein the outer layer comprises a first impermeable material and the core comprises a second material and the second material comprises the same compound as the first impermeable material with a different lattice structure such that the second material and the first impermeable material have different densities;

wherein the plurality of beads are passed into the column at a first temperature and the carrier gas, comprising the vapor, is passed across the beads;

wherein a portion of the vapor desublimates or desublimates and condenses onto the plurality of beads as a solid product, causing the plurality of beads to change in volume as they are warmed to a second temperature; and the column further configured to pass the plurality of beads out of the column.

19. The invention of claim 18, further comprising a heat exchanger, wherein the plurality of beads with the solid product are cooled to the first temperature, causing the beads to change in volume and causing the solid product to flake off of the beads, wherein the heat exchanger passes the solid product out as a product and passing the beads to the column.

20. A system for removing a portion of a vapor from a carrier gas comprising:

a column configured to receive the carrier gas and a plurality of beads and pass the carrier gas across the beads;

wherein the plurality of beads comprise a core and an outer layer and wherein the outer layer comprises a first impermeable material and the core comprises a second material and the second material comprises a porous version of the first material which differs in its thermal expansion coefficient (for polymers and metals) or the same material that has undergone different heat treatment or working to produce different strengths or thermal expansion coefficients (metals) or a different formulation of the same or similar alloy/blend such that it produces different thermal expansion coefficients (metals or plastics);

wherein the plurality of beads are passed into the column at a first temperature and the carrier gas, comprising the vapor, is passed across the beads;

wherein a portion of the vapor desublimates or desublimates and condenses onto the plurality of beads as a solid product, causing the plurality of beads to change in volume as they are warmed to a second temperature; and the column further configured to pass the plurality of beads out of the column.

* * * * *